United States Patent [19]
Brule et al.

[11] Patent Number: 5,027,561
[45] Date of Patent: Jul. 2, 1991

[54] PATTERN SIMULATOR FOR USE WITH A GRINDING MACHINE, IN PARTICULAR A MACHINE FOR GRINDING EYEGLASS LENSES

[75] Inventors: Francois Brule, Champigny-sur-Marne; Alain Chansavoir, Luzancy, both of France

[73] Assignee: Essilor International, Cie Generale d'Optique, Creteil, France

[21] Appl. No.: 409,716

[22] Filed: Sep. 20, 1989

[30] Foreign Application Priority Data

Sep. 22, 1988 [FR] France ................................ 88 12381

[51] Int. Cl.$^5$ ............................................ B24B 49/00
[52] U.S. Cl. .......................... 51/165.77; 51/101 LG; 51/105 LG; 51/106 LG
[58] Field of Search ....... 51/101 R, 101 LG, 105 LG, 51/106 LG, 165.76, 165.77, 165.74; 409/125, 130, 126

[56] References Cited

U.S. PATENT DOCUMENTS

| | | | |
|---|---|---|---|
| 3,498,005 | 3/1970 | Brandt | 51/101 LG |
| 3,688,642 | 9/1972 | Negoro | 409/80 |
| 4,512,108 | 4/1985 | Kobayashi | 51/101 LG |

FOREIGN PATENT DOCUMENTS

| | | |
|---|---|---|
| 0143468 | 6/1985 | European Pat. Off. . |
| 2481635 | 11/1981 | France . |
| 2183184 | 6/1987 | United Kingdom . |

Primary Examiner—Maurina Rachuba
Attorney, Agent, or Firm—Charles A. Brown

[57] ABSTRACT

A pattern simulator is for use with a grinding machine, especially a machine for grinding eyeglass frames, the machine comprising a grinding wheel support shaft, a pattern support shaft coplanar with the grinding wheel support shaft and a box member carrying the pattern support shaft and adapted to pivot relative to the grinding wheel support shaft. A bearing key in the grinding machine is adapted to support a pattern mounted on the pattern support shaft, an end of which overlies the bearing key. The pattern simulator is adapted to conjugate the distance between the grinding wheel support shaft and the pattern support shaft with the angle of rotation of the pattern support shaft on itself relative to a reference. The pattern simulator constitutes a self-contained mechanical entity and comprises a mounting piece adapted to be fitted to the pattern support shaft of the grinding machine and keyed to it to rotate with it. It further comprises a frame rotatably mounted on the mounting piece and a skid carried by the frame adapted to bear on the bearing key of the grinding machine and movable on the frame in translation substantially perpendicularly to an axis of the mounting piece. The pattern simulator finally comprises angulation means adapted to control the angular orientation of the mounting piece about its axis.

11 Claims, 3 Drawing Sheets

PATTERN SIMULATOR FOR USE WITH A GRINDING MACHINE, IN PARTICULAR A MACHINE FOR GRINDING EYEGLASS LENSES

BACKGROUND OF THE INVENTION

1. Field of the invention

The present invention concerns grinding machines including a grinding wheel support shaft and a pattern support shaft coplanar with the grinding wheel support shaft carried by a box member adapted to pivot relative to the grinding wheel support shaft, the end of the pattern support shaft overlying a bearing key adapted to support a pattern attached to the pattern support shaft.

Grinding machines of this type are used among other things for trimming ophthalmic lenses to be fitted to eyeglass frames.

2. Description of the Prior Art

The usual method employed at present for trimming an eyeglass lens is to attach to the pattern support shaft of a grinding machine of this kind, in line with the corresponding bearing key, a pattern the contour of which is identical to that of the ring or surround of the eyeglass frame concerned while the eyeglass lens itself is attached to the pattern support shaft, or to a shaft constrained to rotate with it, in line with a grinding wheel carried by the grinding wheel support shaft.

The engagement of the eyeglass lens with the grinding wheel and therefore the trimming of the lens continue of themselves until, in the relevant angular position of the pattern support shaft, the pattern carried by the latter shaft comes into contact with the bearing key provided for this purpose and it then remains only to rotate the pattern support shaft on itself to bring about progressively the required trimming.

This trimming is effected by copying and is therefore equivalent to conjugating with the angle $\alpha$ by which the pattern support shaft has rotated on itself relative to a reference a specific distance D between the pattern support axis and the grinding wheel support axis.

There have been proposed grinding machines in which this conjugation of the distance D with the angle $\alpha$ is effected directly using a contour following device adapted to obtain the corresponding geometrical data from the eyeglass frame concerned without any material pattern being produced between this measuring and the trimming.

This is the case, for example, with the grinding machine briefly described in French patent No 2 481 635.

In practice, it is just as if a pattern simulator were integrated into the grinding machine to drive it directly from the measurements made by a contour following device, the pattern that it provides being, at most, merely shown by a plot on a screen.

A grinding machine of this kind is inevitably relatively complex and therefore costly and does not enable use of a real pattern in cases where a pattern is already available.

Its characteristic feature also means that the advantages of a pattern simulator cannot be obtained with grinding machines not originally provided with one.

U.S. Pat. No. 3,688,642 describes a pattern simulator comprising a stylus adapted to be deflected under the control of a member movable along X, Y, Z axes while the machine concerned includes a detector responsive to deflection of the stylus. Assuming such a thing were possible, no combination of this document with the previous document would make it possible to confer the advantages of a pattern simulator on grinding machines not initially provided with same.

A general object of the present invention is to provide a pattern simulator that has the advantage of being usable on any existing grinding machine of this kind.

SUMMARY OF THE INVENTION

The present invention consists in a pattern simulator for use with a grinding machine comprising a grinding wheel support shaft, a pattern support shaft coplanar with the grinding wheel support shaft, a box member carrying the pattern support shaft and adapted to pivot relative to the grinding wheel support shaft, a bearing key adapted to support a pattern mounted on the pattern support shaft and an end of the pattern support shaft overlying the bearing key, the pattern simulator being adapted to conjugate the distance between the grinding wheel support shaft and the pattern support shaft with the angle of rotation of the pattern support shaft on itself relative to a reference, the pattern simulator constituting a self-contained mechanical entity and comprising a mounting piece adapted to be fitted to the pattern support shaft of the grinding machine and keyed thereto to rotate with, a frame rotatably mounted on the mounting piece, a skid carried by the frame adapted to bear on the bearing key of the grinding machine and movable on the frame in translation substantially perpendicularly to an axis of the mounting piece and angulation means adapted to control the angular orientation of the mounting piece about its axis.

Constituting a self-contained mechanical entity, the pattern simulator in accordance with the invention can advantageously be fitted to any conventional grinding machine, meaning any existing grinding machine lacking any such integrated pattern simulator, even if only for reasons of simplicity of construction.

It offers the advantage of enabling a contour following device to be coupled to a conventional grinding machine of this kind so that an initially less comprehensive machine can be progressively improved in a modular fashion, the improved grinding machine being rendered to some degree numerically controlled.

The pattern simulator preferably further comprises a bush between the frame and the mounting piece on which the frame is adapted to rotate and which is adapted to be fastened to the pivoting box member of the grinding machine and to rotate relative to the mounting piece and orientation means associated with the frame adapted to maintain the direction of translation movement of the skid in a plane defined by the grinding wheel support shaft and the pattern support shaft.

For example, the orientation means may comprise a cam adapted to be coupled to the bearing key of the grinding machine and including a slot engaged with at least one follower pin carried by the frame.

The effect of the orientation means is that the angular position of the pattern support shaft, and therefore that of the object to be ground, as represented by the angle $\alpha$, is established relative to the plane formed by the pattern support shaft and the grinding wheel support shaft without there being any necessity to take into account the angle at which the pivoting box member carrying the pattern support shaft of the grinding machine is tilted relative to the grinding wheel support shaft.

Thus in the case of trimming an eyeglass frame the distance to be complied with between the pattern support shaft and the grinding wheel support shaft for a given angular position of the pattern support shaft is advantageously the same whether the eyeglass lens is the lefthand lens or the righthand lens.

The practitioner finds the resulting machine easier to use because of the reduced computation time and data transmission time.

The characteristics and advantages of the invention will emerge from the following description given by way of non-limiting example only with reference to the appended diagrammatic drawings.

DESCRIPTION OF THE PREFERRED EMBODIMENT

Figure 1:
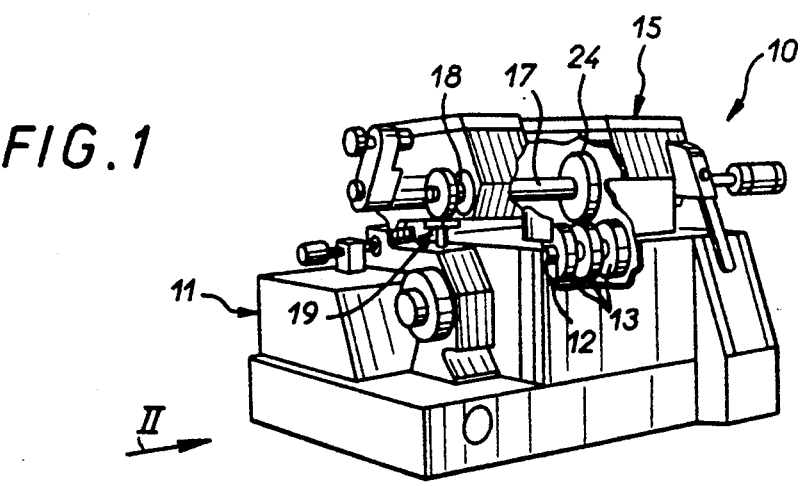
FIG. 1 a partially cut away perspective view of a grinding machine adapted to be fitted with a pattern simulator in accordance with the invention.

FIG. 1 shows a grinding machine 10 of the type conventionally employed for trimming eyeglass lenses.

As this grinding machine is well known in itself and does not of itself form any part of the present invention it will not be described in complete detail here.

Only its component parts necessary to understanding the invention will be briefly described.

The grinding machine 10 comprises a frame 11 on which is rotatably mounted a grinding wheel support shaft 12 with three grinding wheels 13 keyed to it to rotate with it.

A box member 15 is mounted on the frame 11 to pivot about a shaft 14 parallel to the grinding wheel support shaft 12.

A pattern support shaft 17 is rotatably mounted on the pivoting box member 15. It is coplanar with the grinding wheel support shaft 12 and its end 18 outside the pivoting box member 15 overlies a bearing key 19 adapted to support the assembly, as will emerge hereinafter.

The pattern support shaft 17 is parallel to the grinding wheel support shaft 12.

Let P denote the corresponding plane.

Figure 2:
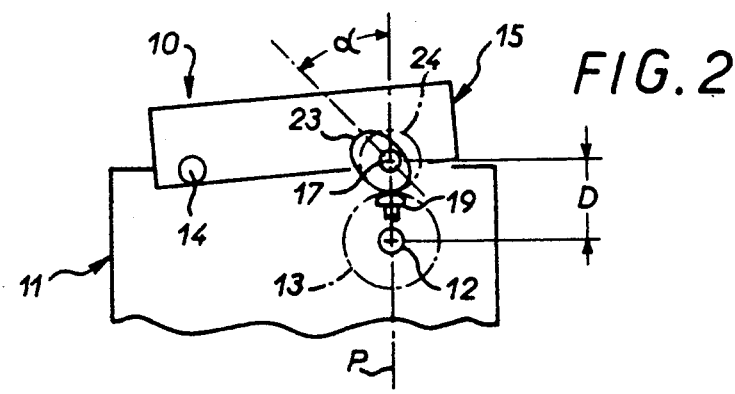
FIG. 2 is a partial schematic view in elevation of the grinding machine as seen in the direction of the arrow II in FIG. 1.
Figure 3:
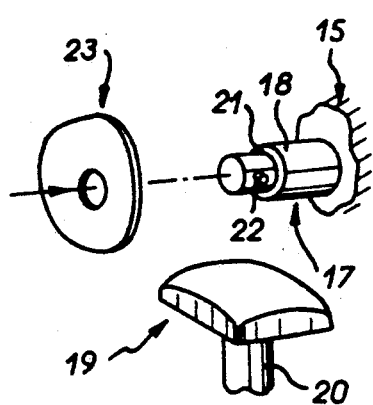
FIG. 3 is a partial perspective view to a larger scale of the component parts of the grinding machine to which the invention more particularly relates, with the pattern usually associated with them shown separated from them.

The location of this plane P is schematically shown in chain-dotted outline in FIG. 2.

The bearing key 19 is in the form of a rectangular buffer with a domed upper surface and is carried by a column 20.

A pattern 23 can be fitted to the end 18 of the pattern support shaft 17 and fastened to it to rotate with it, between a shoulder 21 on the shaft end 18 and a pin 22. The contour of the pattern 23 reproduces that of the ring or surround of the eyeglass frame concerned.

The edge of the pattern 23 bears on the bearing key 29 and it is therefore through the intermediary of the pattern 23 that the pivoting box member 15 bears on the latter.

The eyeglass lens 24 to be trimmed can be attached to the inner end of the pattern support shaft 17 or to a shaft constrained to rotate with it, inside the pivoting box member 15.

To trim the eyeglass lens 24 its edge is brought into contact with one of the grinding wheels 13.

As the grinding wheel support shaft 12 and the pattern support shaft 17 can both rotate the grinding due to this contact continues until, for each angular position of the pattern support shaft 17, the pattern 23 is in contact with the bearing key 19.

Let D be the distance between the pattern support shaft 17 and the grinding wheel support shaft 12 and let $\alpha$ be the angle of rotation of the pattern support shaft 17 on itself relative to a specific reference (see FIG. 2).

In practice (FIG. 2), this reference is the plane P formed by the grinding wheel support shaft 12 and the pattern support shaft 17.

In order for the trimmed eyeglass lens 24 to correspond to the ring or surround of the eyeglass frame concerned this distance D and this angle $\alpha$ must be conjugate in the same way for the eyeglass lens and for the ring or surround.

Because it is contrained to rotate with the eyeglass lens 24 the pattern 23 procures this conjugation mechanically.

In accordance with the invention there is substituted for it a pattern simulator 25 adapted to fulfill the same function on the basis of geometrical distance D and angle $\alpha$ data supplied to it by contour following device (not shown) deriving this data directly from the ring or surround in question.

The pattern simulator 25 in accordance with the invention is a self-contained mechanical entity comprising a mounting piece 27 by means of which it is adapted to be fitted to the pattern support shaft 17 of the grinding machine 10, to be more precise to the exterior end 18 of the pattern support shaft 17, instead and in place of a pattern 23 and which is adapted to be keyed to said pattern support shaft 17 to rotate with it. It further comprises a frame 28 carried by said mounting piece 27 and adapted to rotate relative to it and, carried by said frame 28, a skid 29 through which it is adapted to bear on the bearing key 19 of the grinding machine 10 and which under the control of control means to be described later is mounted to move in translation in a direction T substantially perpendicular to the axis of said mounting piece 27, and means, referred to hereinafter for convenience only as angulation means, adapted to control the orientation of the mounting piece 27; these angulation means will also be described in more detail later.

The mounting piece 27 includes a shoulder like the end 18 of the pattern support shaft 17. It has along a generatrix a slot 31 adapted to fit over the pin 22 carried by the end 18 of the pattern support shaft 17, so that it is keyed to it to rotate with it.

For reasons to be explained later its back end includes an axial bore 32 for rotating it.

In the embodiment shown the frame 28 is formed by two parallel flanges 33, 34 disposed transversely to the axis of the mounting piece 27. They are joined together by three cross-members 35.

The flange 33 is somewhat massive and its external surface forms cooling fins 36. A central aperture 37 in it extends annularly around the mounting piece 27.

The flange 34 is thinner than the flange 33 and is at a distance from the mounting piece 27.

The entire assembly is provided with a cover 39.

Figure 5:
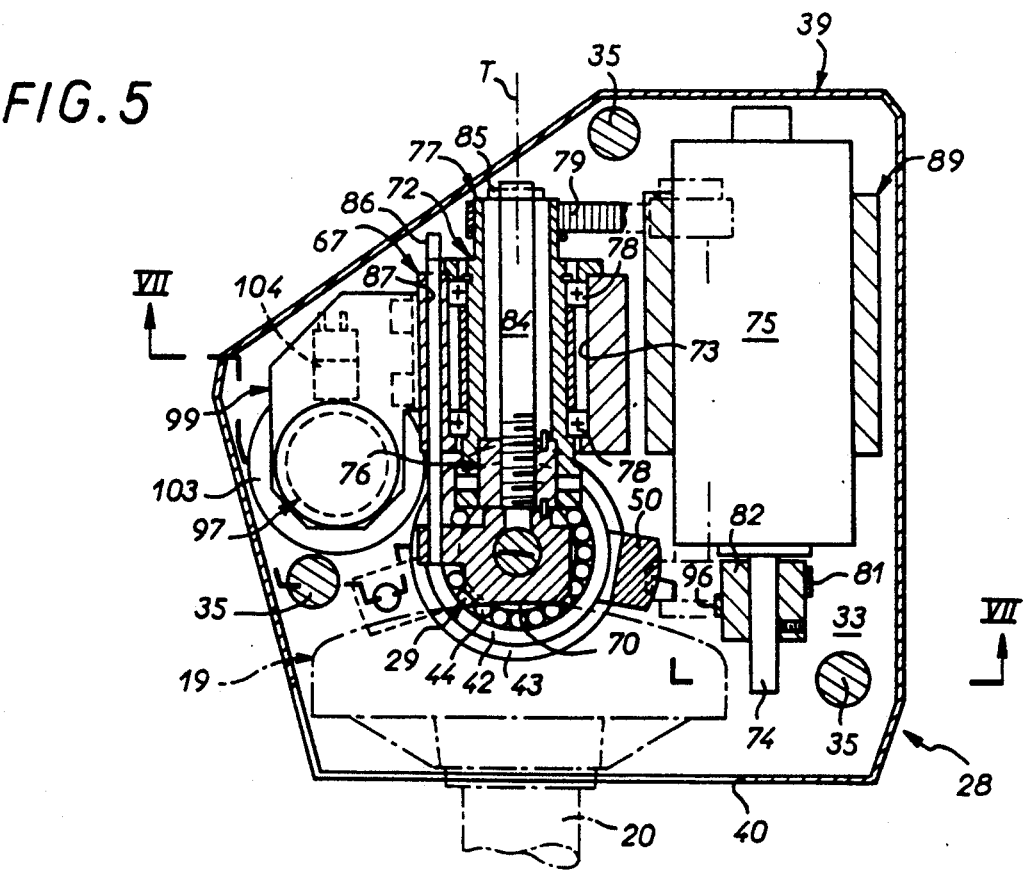
FIGS. 5 and 6 are views of the pattern simulator to a different scale and respectively in transverse cross-section on the lines V—V and VI—VI in FIG. 4.
Figure 8:
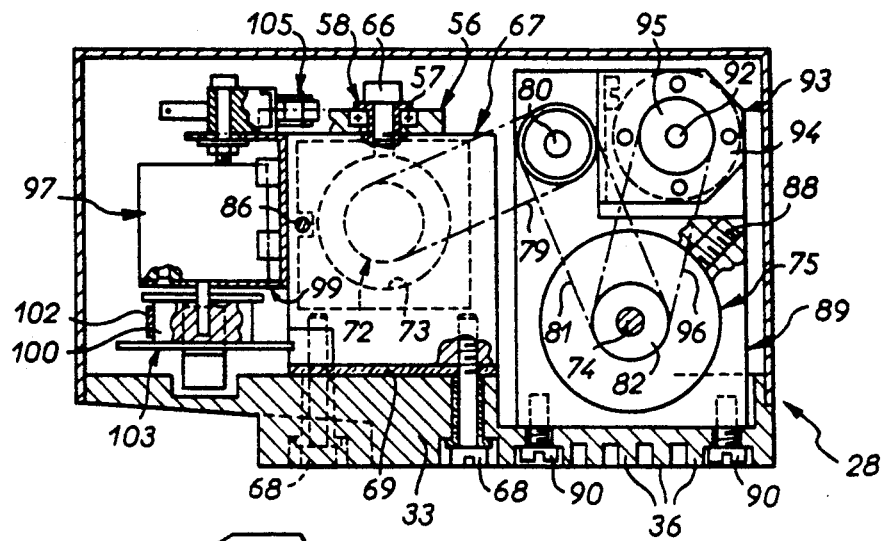
FIG. 8 is another view of it in axial cross-section substantially on the line VIII—VIII in FIG. 6.
Figure 6:
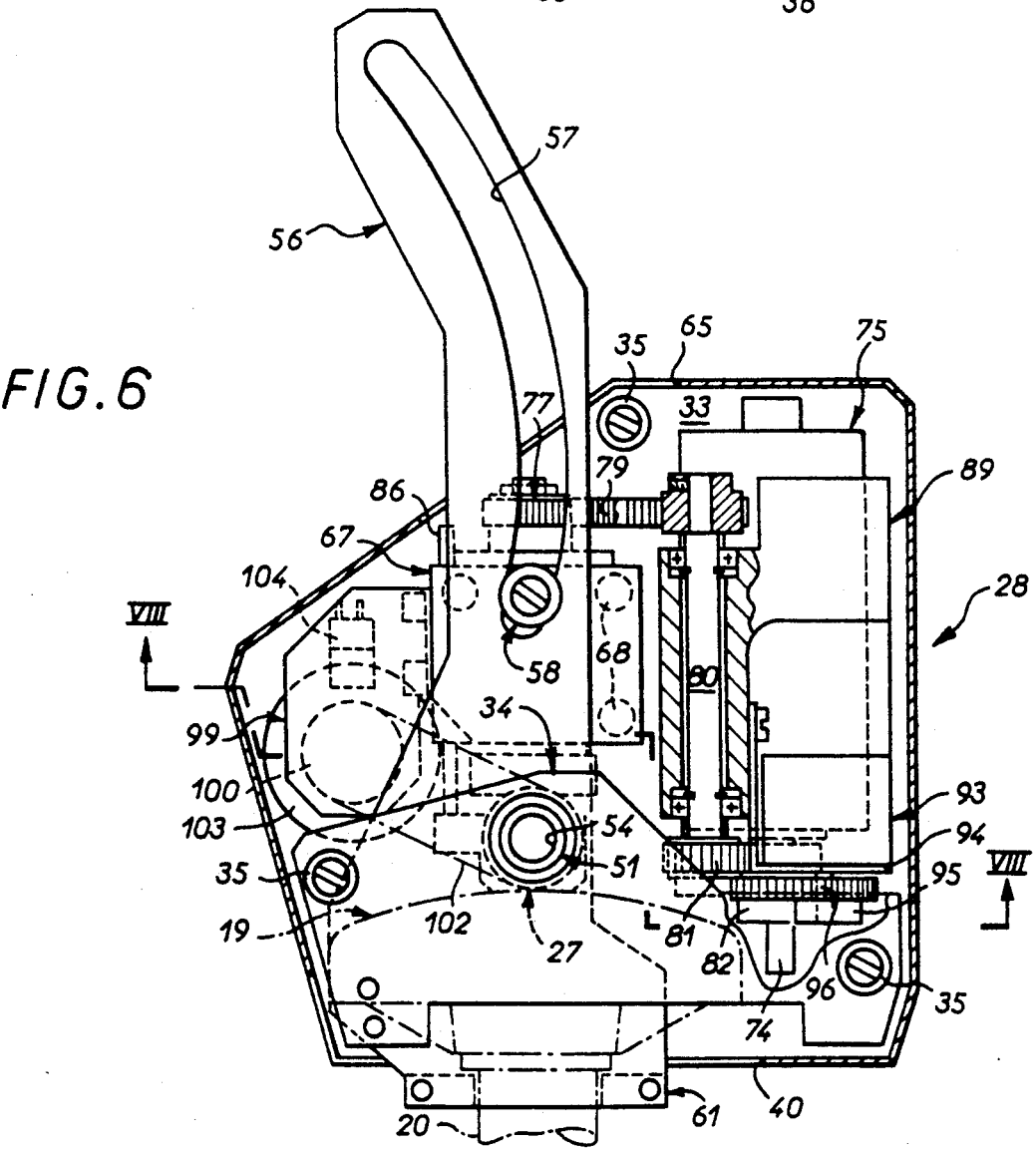

An opening 40 at the edge of this cover in line with the skid 29 enables the assembly to be fitted over the bearing key 19 of the grinding machine 10 (see FIGS. 5 and 6).

Between this frame 28 and the mounting piece 27 there is a bush 42 relative to which, by virtue of the central aperture 37 in its flange 33, said frame 28 can rotate, a synthetic material friction ring 43 being disposed between them; adapted to be fastened to the pivoting box member 15 of the grinding machine 10, it is mounted to rotate relative to said mounting piece 27 with a bearing 44 disposed between it and the latter.

The bush 42 has a lateral lug 45 at its outside end by means of which it can be attached to the pivoting box member 15 of the grinding machine 10 by a screw 46.

This fastening of the bush 42 to the pivoting box member 15 secures the pattern simulator 25 as a whole relative to the pivoting box member 15 in the axial direction.

The bush 42 and the mounting piece 27 are fastened together in the axial direction.

Figure 7:
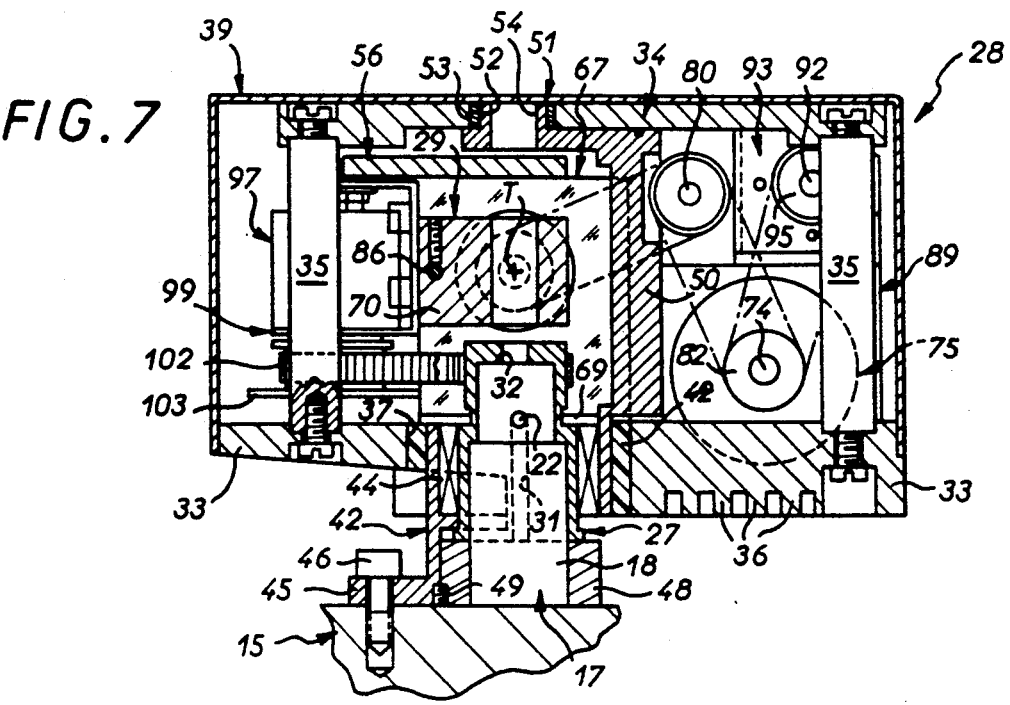
FIG. 7 is a view of it in axial cross-section substantially on the broken line VII—VII in FIG. 5.

As shown in FIG. 7, they have respective transverse shoulders held together by a friction ring 48 retained axially by a screw 49.

An eccentric arm 50 parallel to and spaced from the axis of the mounting piece 27 extends between the flanges 33 and 34 of the frame 28. It joins the bush 42 to a centering piece 51 which is coaxial with the mounting piece 27 and relative to which said frame 28 is rotatable, by virtue of a hole 52 in the flange 34, a synthetic material friction ring 53 being disposed between them.

The frame 28 extends between the bush 42 and the centering piece 51, parallel to the axis of the mounting piece 27, and so is not in a cantilever arrangement.

The centering piece 51 includes an axial bore 54 providing access to the bore 32 in the mounting piece 27.

It is therefore advantageously possible during assembly to rotate the mounting piece 27 on itself from outside the frame 28 using any kind of tool, until it is offered up correctly to the end 18 of the pattern support shaft 17.

Associated with the frame 28 are means referred to hereinafter for convenience only as orientation means adapted to maintain the direction of translation movement T of the skid 29 in the plane P formed by the grinding wheel support shaft 12 and the pattern support shaft 17 of the grinding machine 10.

This translation direction T is shown in chain-dotted outline in FIG. 5 and its location is schematically represented in FIG. 7.

The orientation means associated with the frame 28 comprise a cam 56 adapted to be coupled to the grinding machine 10 and engaged by means of a slot 57 with a follower pin 58 carried by the frame 28.

Figure 4:
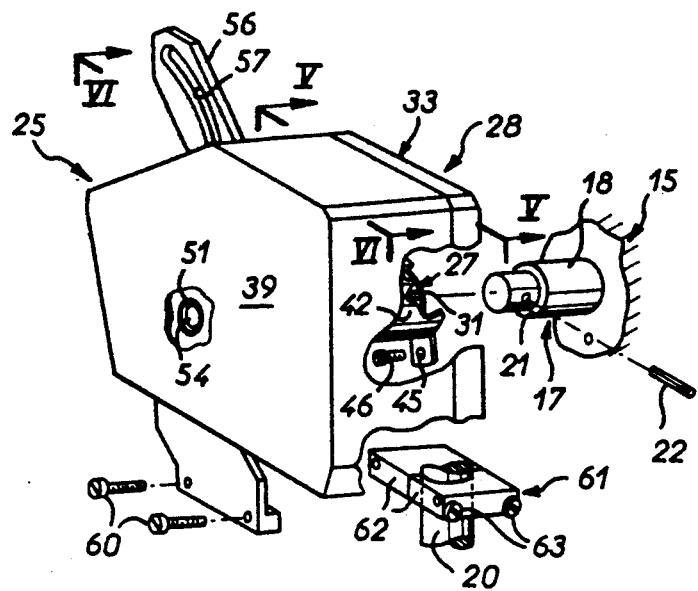
FIG. 4 is a partially cut away perspective view similar to that of FIG. 3 showing a pattern simulator in accordance with the invention substituted for the pattern, certain component parts of the pattern simulator being shown separated therefrom.

To be more precise, the cam 56 is transversely disposed relative to the axis of the mounting piece 27 and its base is attached by screws 60 (FIG. 4) to a collar 61 by means of which it is adapted to be attached to the column 20 carrying the bearing key 19 of the grinding machine 10; the collar 61 is formed by two half-collars 62 fastened together by screws 63.

The other end of the cam 56 projects outside the frame 28, the corresponding edge of the cover 39 attached to the latter having for this purpose an opening 65 opposite the opening 40 (FIG. 6).

In this embodiment there is only one follower pin 58, although there could be more than one.

This simplifies the shape of the slot 57.

The slot is slightly curved and is substantially circular arc shaped.

This avoids any unwanted force on the skid 29.

The follower pin 58 is attached by a screw 66 to a central block 67 attached by screws 68 to the flange 33 of the frame 28, with a thermally insulative plate 69 disposed between them. The eccentric arm 50 joining the bush 42 to the centering piece 51 circumvents the central block 67 transversely.

By virtue of the arrangements as previously described, the relatively massive skid 29 has a plane surface 70 which contacts the bearing key 19 of the grinding machine 10.

The means controlling the skid 29 comprise a screw-and-nut (screwjack type) actuator 72 which extends along the translation direction T by virtue of an opening 73 in the central block 67. Either part (the screw or the nut) can be keyed to the frame 28 and carried said skid 29 while the other part is keyed to the output shaft 74 of a motor 75 to rotate with it. Here the nut 76 of the actuator 72 is constrained to rotate with a tubular bush 77 which extends along the translation direction T by virtue of the opening 73 in the central box 67, with appropriately cross-braced bearings 78 disposed between it and the latter. By means of a notched belt 79 it is coupled to an intermediate shaft 80 with which is likewise coupled by a notched belt 81 to a gear 82 keyed to the output shaft 74 of the motor 75.

The screw 84 of the actuator 72 extends along the axis of the bush 73 and is engaged screwthread-fashion with the nut 76 to which the bush is fastened. It carries at one end the skid 29 and at the other end a stop ring 85. The skid 29 is fastened to a guide rod 86 parallel to the translation direction T and sliding in a bore 87 provided for this purpose in the central block 67.

The motor 75 is attached by screws 88 to a support block 89 attached by screws 90 to the flange 33 of the frame 28.

The support block 89 is preferably in a material that is a good conductor of heat, such as aluminum, for example, in order to conduct heat from the motor 75 to the fins 36 on the flange 33.

The output shaft 92 of an optical coder 93 adapted to indicate its angular position about its axis is keyed to the output shaft 74 of the motor 75, in addition to the intermediate shaft 80 and, through the intermediary of the latter, the screw 84 of the actuator 72.

The coder 93 is attached by a bracket 94 to the support block 89 and a gear 95 keyed to its output shaft 92 is coupled through a notched belt 96 to the gear 82 keyed to the output shaft 74 of the motor 75.

The angulation means associated with the mounting piece 27 likewise comprise an optical coder 97 the output shaft 98 of which is keyed to the mounting piece 27 to rotate with it.

The coder 97 is carried by a bracket 99 attached to the central block 67 and keyed to its output shaft 98 to rotate with it is a gear 100 which is coupled to the mounting piece 27 by a notched belt 82.

Also keyed to the output shaft 98 of the coder 97 to rotate with it is a disk 103 adapted to cooperate with a read fork 104 to reset the system.

In line with the cam 56 the bracket 99 carries a contact 105 which is actuated by the cam 56 at the end of a cycle.

In operation the coder 93 registers continuously the angular position of the output shaft 73 of the motor 75 and therefore that of the nut 76 of the actuator 72.

The corresponding reading represents the distance D to be complied with.

Conjointly, the coder 97 continuously registers the angular position of the mounting piece 27 and therefore that of the pattern support shaft 17.

The corresponding reading represents the angle α to be complied with.

The motor 75 is commanded to rotate in one direction or the other o the basis of these readings and the distance and angle data supplied by the associated contour following device.

At the end of the cycle, in other words when the pivoting box member 15 of the grinding machine 10 is returned to a raised position relative to the frame 11 of the latter, the cam 56 operates the contact 105 provided for this purpose so that, as a safety measure, no new work cycle can be initiated unless the previous work cycle has been completed.

Of course, the present invention is not limited to the embodiment described and shown but encompasses any variant execution thereof.

In particular, although at the cost of additional complication, the cam 56 could be mounted to pivot relative to the bearing key 19 of the grinding machine 10, it then cooperating sliding fashion with two follower pins fastened to the frame 28 at a distance from each other.

Also, instead of constituting simple angular measuring means as described hereinabove, the angulation means associated with the mounting piece 27 could equally well constitute means for controlling the angular position of the mounting piece 27.

Finally, the pattern support shaft 17 is not necessarily parallel to the grinding wheel support shaft 12.

To the contrary, and in arrangements that are well known in themselves, the two shafts may be at an angle, especially where conical grinding wheels are employed.

In this case the distance D to be taken into consideration is that between these two shafts in the plane perpendicular to the pattern support shaft 17 passing through the theoretical point of contact between the pattern 23 and the bearing key 19.

We claim:

1. Pattern simulator for use with a grinding machine comprising a grinding wheel support shaft, a pattern support shaft coplanar with the grinding wheel support shaft, a box member carrying said pattern support shaft and mounted for pivotal movement relative to said grinding wheel support shaft, a bearing key for supporting a pattern mounted on said pattern support shaft, an end of said pattern support shaft overlying said bearing key, said pattern simulator defining means for conjugating the distance between said grinding wheel support shaft and said pattern support shaft with the angle of rotation of said pattern support shaft on itself relative to a reference, said pattern simulator constituting a self-contained mechanical entity and comprising mounting piece carried by said frame for bearing engagement with said bearing key of the grinding machine and movable on said frame in translation substantially perpendicularly to an axis of said mounting piece, and angulation means for controlling the angular orientation of said mounting piece about its axis.

2. Pattern simulator according to claim 1 further comprising a bush between said frame and said mounting piece, said frame being rotatable relative to said bush, said bush being fixed relative to said pivoting box member of the grinding machine and rotatable relative to said mounting piece, and orientation means associated with said frame maintaining the direction of translation movement of said skid in a plane defined by said grinding wheel support shaft and said pattern support shaft.

3. Pattern simulator according to claim 2 wherein said orientation means comprise a cam couplable to said bearing key of the grinding machine and including a slot engaged with at least one follower pin carried by said frame.

4. Pattern simulator according to claim 3 wherein, said bearing key of said grinding machine is carried by a column, said orientation means further comprise a collar attached to said cam and fastenable to said column, and a single follower pin is provided on said frame.

5. Pattern simulator according to claim 1 wherein said skid has a plane surface engageable with said bearing key.

6. Pattern simulator according to claim 1 further comprising a motor and control means for said skid comprising a screw-and-nut actuator including one member keyed to said frame and carrying said skid and another member keyed to an output shaft of said motor to rotate therewith.

7. Pattern simulator according to claim 6 further comprising a coder keyed to said motor output shaft to rotate therewith.

8. Pattern simulator according to claim 1 wherein said angulation means comprise a coder having a shaft keyed to said mounting piece to rotate therewith.

9. Pattern simulator according to claim 2 further comprising a centering piece coaxial with said mounting piece and an eccentric arm coupling said centering piece to said bush, said frame being disposed parallel to said axis of said mounting piece between said bush and said centering piece.

10. Pattern simulator according to claim 9 wherein said centering piece includes an axial bore.

11. Pattern simulator according to claim 1 wherein said reference is the plane defined by said pattern support shaft and said grinding wheel support shaft.

* * * * *